United States Patent
Satzger

(10) Patent No.: US 6,244,619 B1
(45) Date of Patent: Jun. 12, 2001

(54) SAFETY ARRANGEMENT

(75) Inventor: Guido Satzger, Munich (DE)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 09/603,619

(22) Filed: Jun. 26, 2000

(30) Foreign Application Priority Data

Jun. 25, 1999 (GB) .................................................. 9914953

(51) Int. Cl.$^7$ ................................................ B60R 21/22
(52) U.S. Cl. ...................................... 280/730.2; 280/741
(58) Field of Search ................................ 280/730.2, 741

(56) References Cited

U.S. PATENT DOCUMENTS 5,755,457 * 5/1998 Specht ............................. 280/730.2
5,884,937 * 3/1999 Yamada ........................... 280/730.2
5,921,575 * 7/1999 Kretschmer et al. ............. 280/730.2
6,103,984 * 8/2000 Bowers et al. ................... 280/730.2
6,106,006 * 8/2000 Bowers et al. ................... 280/730.2

FOREIGN PATENT DOCUMENTS 2 314 300   12/1997   (GB) .
2 319 751   6/1998    (GB) .

* cited by examiner

Primary Examiner—Kenneth R. Rice
(74) Attorney, Agent, or Firm—Venable; Robert Kinberg

(57) ABSTRACT

An inflatable element adapted to be inflated with gas from a gas generator (2) includes a gas flow duct (6) leading from the gas generator to a plurality of cells (8, 9, 10, 11, 12) which are to be inflated. An elongate element (20) having a plurality of substantially helical turns is within the gas flow duct, the axis of the elongate element being substantially coincident.

17 Claims, 4 Drawing Sheets

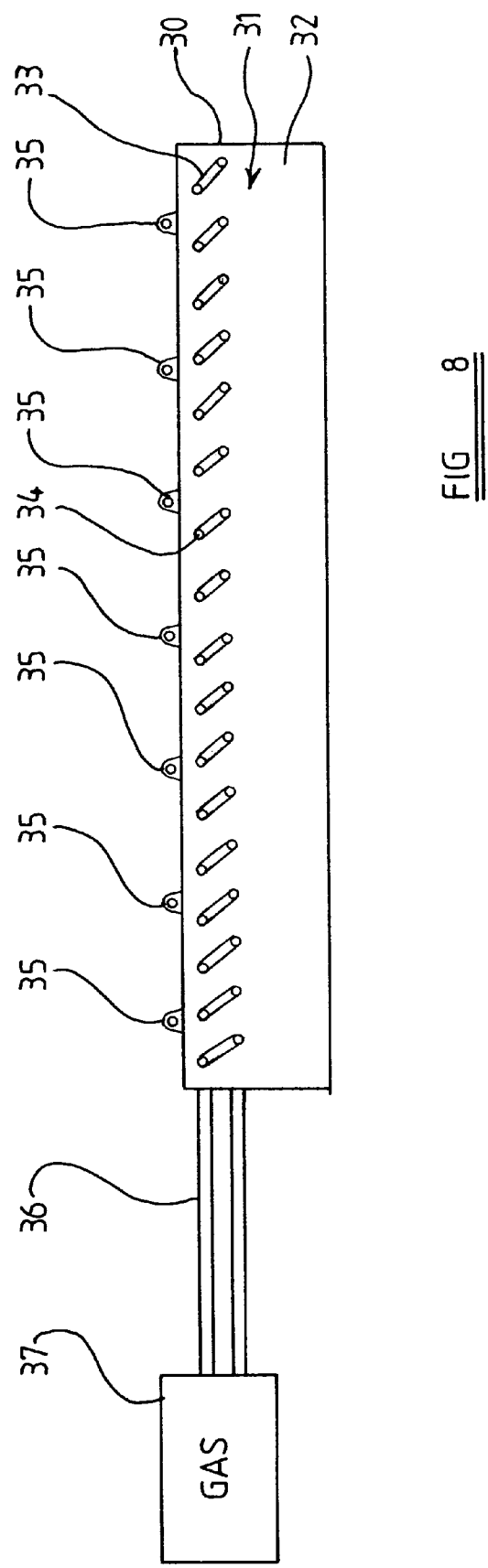

SAFETY ARRANGEMENT

Figure 1:
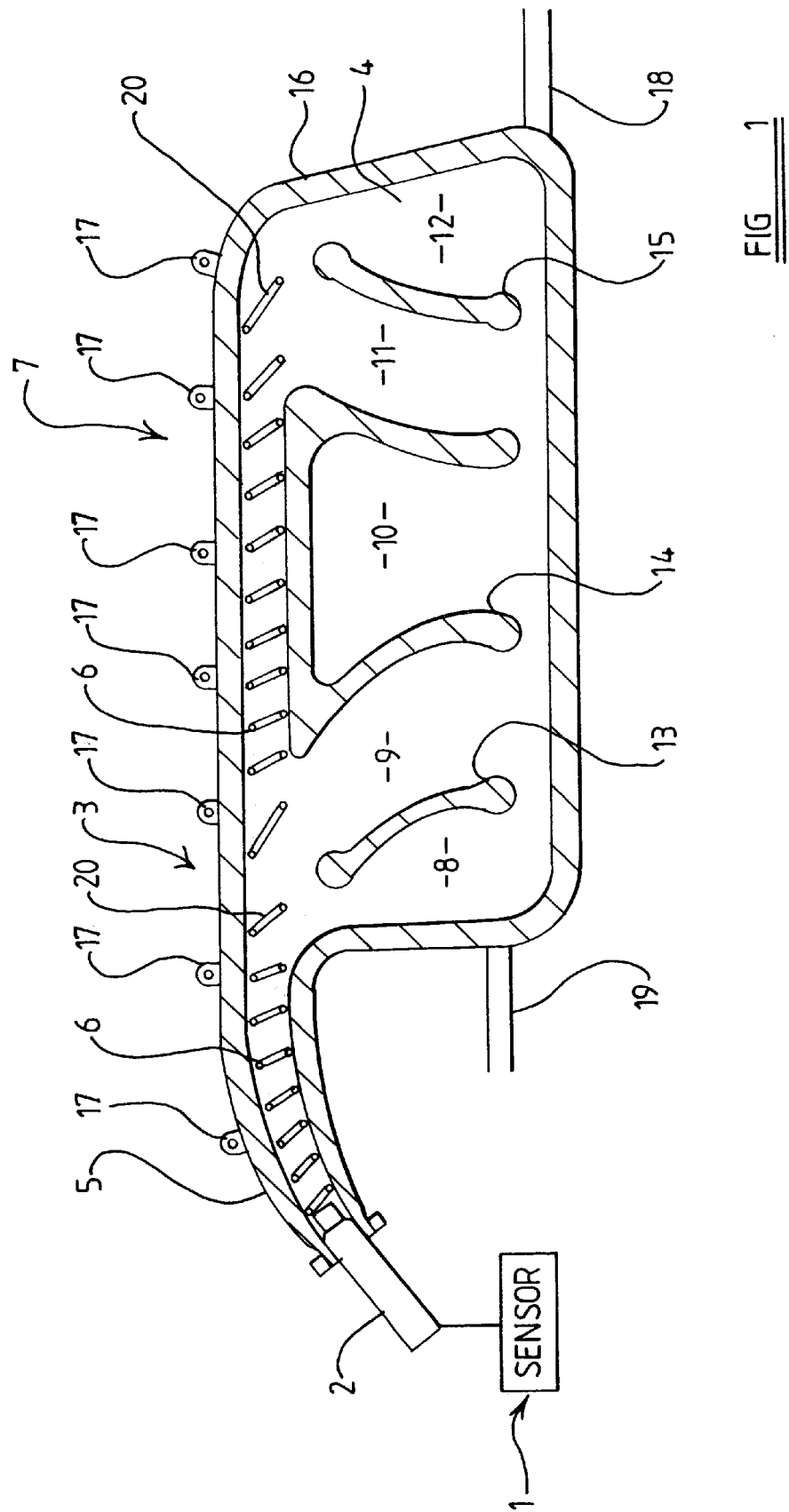

THE PRESENT INVENTION relates to a safety arrangement, and more particularly to a safety arrangemnent adapted for use in a motor vehicle.

It has been proposed previously to provide an inflatable element initially provided within the roof of a motor vehicle, with the inflatable element initially extending, in the uninflated state, across the top of a door or window opening in the vehicle. In the event that an accident occurs, the inflatable element, which is typically made of fabric, is inflated, and part of the inflatable element extends adjacent the window or door opening as an inflated curtain. Such an inflatable element may protect the driver or occupant of a vehicle in a side impact or roll-over situation.

Typically the palt of the inflatable element that extends adjacent the window or door opening has a plurality of cells, and the cells have to be filled with gas in a very short period of time, typically less than 20 ms. Gas must therefore be injected into the cells very rapidly, meaning that the gas has a high velocity and may thus damage the fabric forming the inflatable element.

GB 2,319,751A discloses an inflatable element of this general type in which a rigid gas duct is provided mounted within the inflatable element. The gas duct is adapted to provide gas to each of the plurality of cells. Because the gas duct is rigid, different models of inflatable element have to be manufactured for different models of motor vehicles, since typically the roof line of each model of motor vehicle is unique. The gas duct must be manufactured to close tolerances to ensure that the inflatable element can be mounted in position satisfactorily. A further difficulty that can sometimes arise with a rigid gas duct is that should the gas duct be damaged during the initial phases of the side impact, part of the duct could be crushed, preventing the subsequent flow of gas along the duct. The presence of the rigid gas duct may make it difficult to transport the inflatable elements from their place of manufacture to the vehicle assembly plant.

GB-A-2,3 14,300 discloses another inflatable element of the type under consideration. In this arrangement the gas duct is formed of a part of the gas flow duct which initially extends away from the inflatable element which has been folded back inside itself to form an inner tubular wall within the gas duct. The double thickness of fabric present where the gas duct is folded back inside itself minimises the risk of the fabric being damaged by the rapidly flowing gas. However, it has been found relatively expensive to manufacture inflatable elements of this type, and the gas has to force away through the inner folded back part of the flow passage, which may be flat at the beginning of the inflation process, thus substantially retarding the inflation process.

The invention seeks to provide an improved safety arrangement.

According to this invention there is provided a safety arrangement comprising an inflatable element adapted to be mounted in a motor vehicle, the inflatable element being associated with a gas generator adapted to generate gas in an accident situation, the inflatable element defining a gas flow duct leading from the gas generator to a region defining one or more cells adapted to be inflated by gas from the gas generator, the gas flow duct containing an elongate element having a plurality of adjacent substantially helical turns defining a longitudinal axis, the axis of the elongate element being substantially coincident with the axis of the gas flow duct, gas from the gas generator flowing through a flow passage defined within the turns of the said elongate element.

Preferably the said region of the inflatable element defines a plurality of generally parallel cells.

Advantageously the gas flow duct extends adjacent a plurality of said cells to supply gas to the cells, the elongate element being positioned to extend through that part of the gas flow duct.

Preferably the elongate element has a degree of flexibility.

Conveniently the elongate element is provided with a plurality of turns of constant diameter.

In an alternative embodiment the elongate element is provided with a plurality of turns of successively reducing diameter, the turns of least diameter being spaced furthest from the gas generator.

In one embodiment the end of the elongate element remote from the gas generator has an end cap.

In one embodiment of the invention the elongate element initially has adjacent turns very close to each other, the arrangement being such that the length of the elongate element increases in response to an axial flow of gas therethrough.

Conveniently the element is formed of a wire of circular cross-section.

Alternatively the element is formed of a wire of square cross-section.

In one embodiment the elongate element initially extends over the whole length of the gas flow duct.

In an alternative embodiment the elongate element initially extends over only part of the length of the gas flow duct.

Preferably on inflation of the inflatable element the elongate element extends over the full length of the gas flow duct.

Conveniently when inflated, the turns of the elongate element adjacent the entrances to the cells are further apart than other turns of the elongate element.

Preferably the upper edge of the inflatable element is non-linear, and is provided with means to connect the non-linear upper edge thereof to a non-linear part of a motor vehicle.

Conveniently the lower part of the inflatable region of the inflatable element is provided with at least one strap adapted to extend from the inflatable element to an anchoring point.

In one embodiment the gas generator is connected to the inflatable element by a separate tube.

Figure 2:
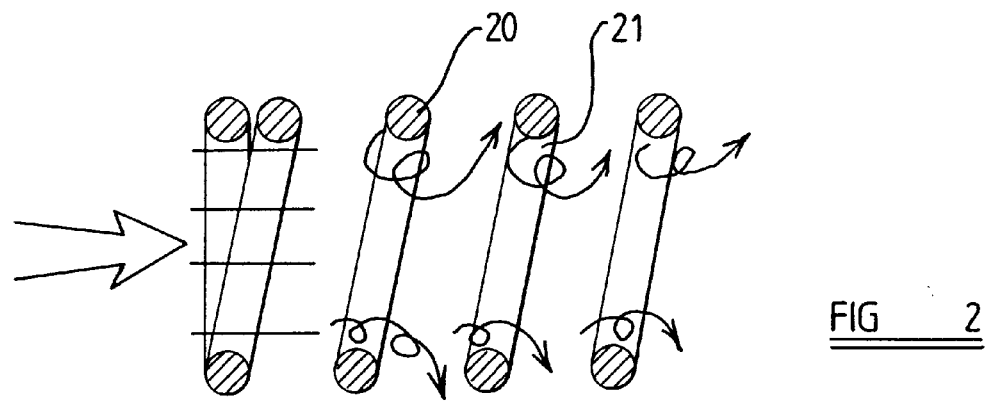
Figure 3:
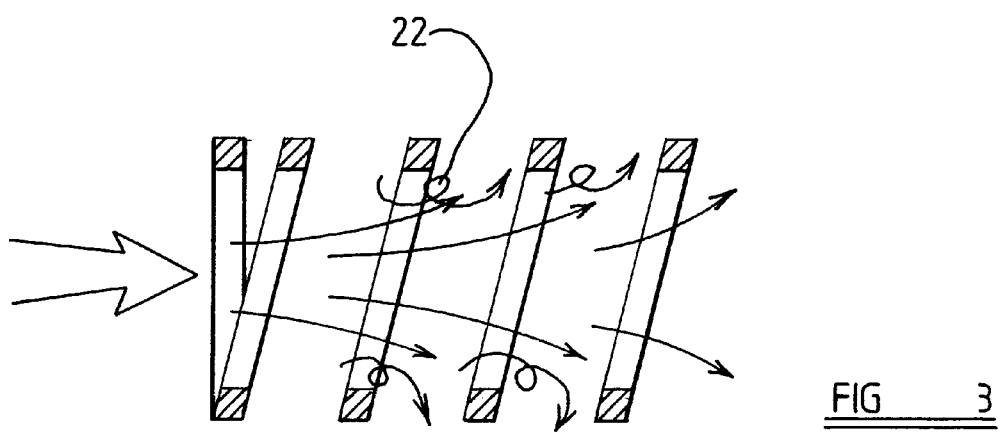
Figure 4:
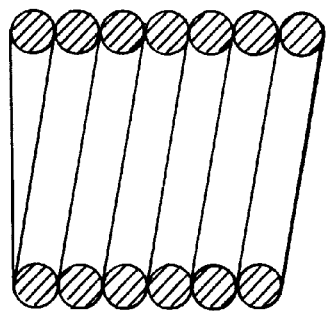
Figure 5:
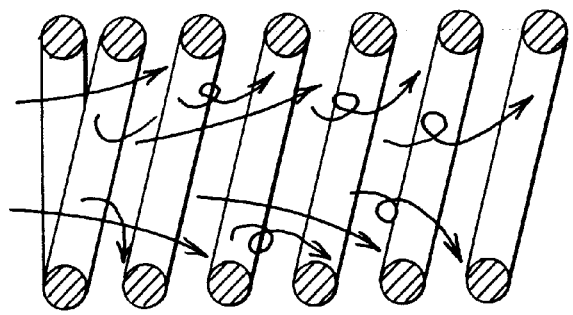
Figure 6:
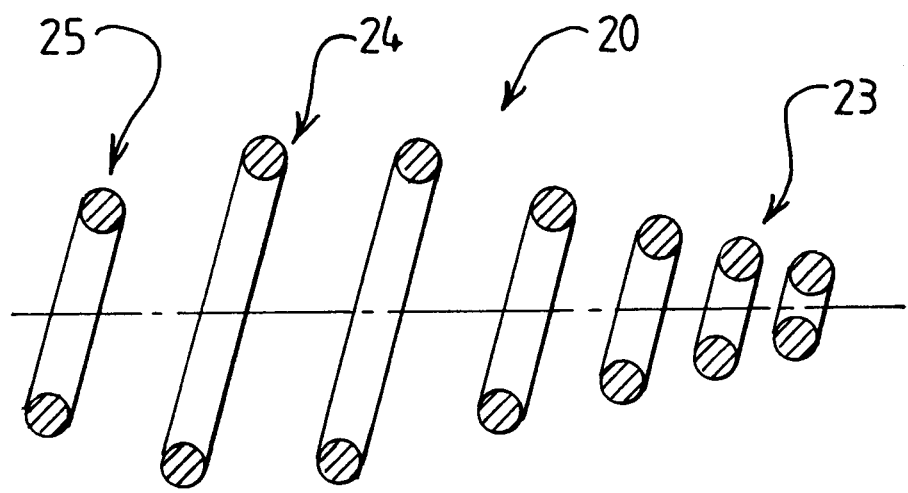
Figure 7:
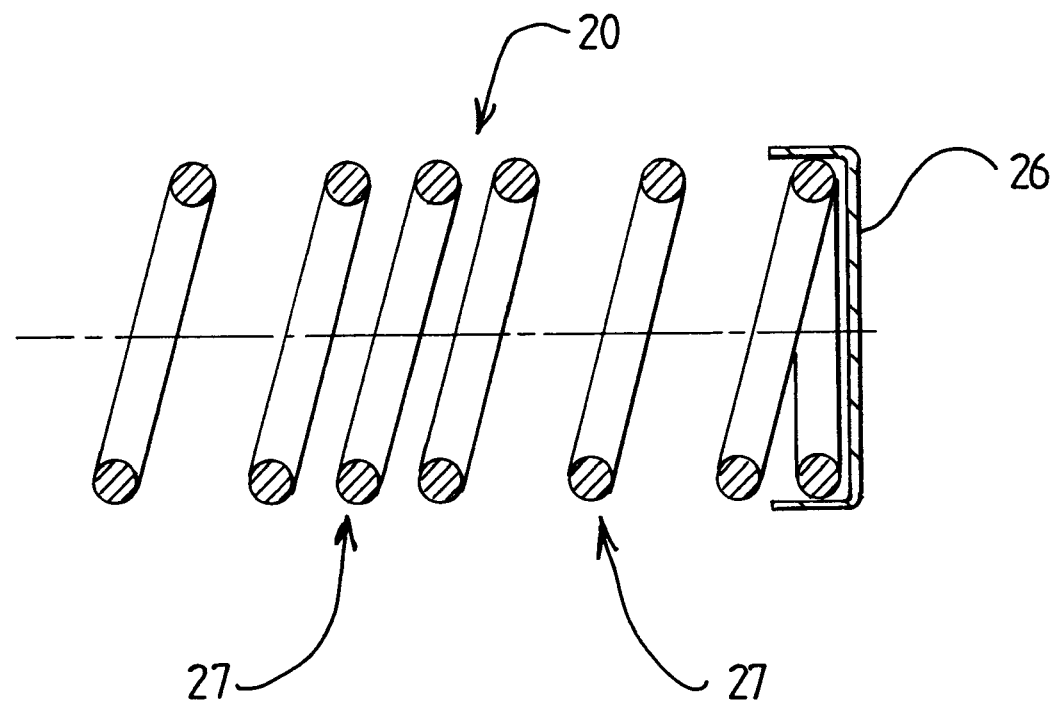

In order that the invention may be more readily understood, and so that further features thereof may be appreciated, the invention will now be described, by way of example, with reference to the accompanying drawings in which:

FIG. 1 is a diagrammatic sectional view of an inflatable element arrangement in accordance with the invention, FIG. 2 is a sectional view of an elongate element used in the embodiment of FIG. 1, FIG. 3 is a sectional view of an alternate element that might be used in an alternate embodiment of the invention, FIG. 4 is a view of a further element used in a further alternative embodiment of the invention in an initial condition, and FIG. 5 is a view of the element of FIG. 4, showing the element in the condition that it occupies when the air-bag is being inflated, FIG. 6 is a sectional view of a further element, FIG. 7 is a sectional view of yet another element, and FIG. 8 is a view, partly in phantom, of a housing containing an inflatable element arrangement in accordance with the invention.

Referring initially to FIG. 1, a safety arrangement includes a sensor 1 adapted to sense a predetermined deceleration of the vehicle. The sensor is adapted to activate a gas generator 2. The gas generator may be a pyrotechnic gas generator or may be a so-called cold gas generator which incorporates a reservoir of gas under pressure.

The gas generator is located to inject gas into an inflatable element 3. The inflatable element 3 may be formed of two layers of fabric which are interconnected by appropriate seams. The seams may be stitched seams, or the seams may be areas where the two layers of fabric are inter-woven. FIG. 1 shows the lower layer of fabric 4 of the inflatable element, also illustrating the positions of the seams. The upper layer of fabric of the inflatable element has been cut away, to form the sectional view provided, for the sake of clarity of illustration.

The inflatable element comprises a first portion 5 of generally tubular form connected to the gas generator. The tubular portion forms an initial part of a gas flow duct 6. The gas flow duct 6 continues across the linear upper edge of a main rectangular portion 7 of the inflatable element. The main rectangular portion 7 is divided into a plurality of cells 8–12 by means of seams 13, 14, 15.

The cells are generally parallel and extend generally vertically. It is to be appreciated that the cells may have many alternate designs.

The outer periphery of the two layers of fabric is connected together by a peripheral seam 16, so that the main rectangular portion 7 may be inflated.

The upper edge of the inflatable element 3 is non-linear and is provided with a plurality of tabs 17 by means of which the inflatable element 3 may be mounted in position in a motor vehicle. Typically the tabs 17 would be connected to a non-linear part of the motor vehicle located partly along the A-Post and above the front door opening of the vehicle, or extending between the A-Post and the C-Post.

The inflatable element, in the embodiment shown is provided with two straps 18, 19 which extend from the lower edges of the generally rectangular portion 7 of the inflatable element 3. These straps may be connected to appropriate parts of the motor vehicle, such as the A-Post for the strap 18, and the B- or C-Post for the strap 19.

The arrangement is such that as the inflatable element is inflated, a line of tension is created adjacent the lower edge of the rectangular region, by virtue of the fact that the straps 18 and 19 are fixed to anchoring positions, and the diameter of each of the cells 8–12 will increase as the cell is inflated, thus effectively reducing the length of the rectangular portion 7 between the straps 18 and 19.

In the inflatable element illustrated, contained within the gas flow duct, is an elongate element 20 comprising a plurality of successive substantially helical turns. The elongate element is made of a rigid material, such as steel, that is adapted to be exposed to hot gases if a pyrotechnic gas generator is used. If a cold gas generator is used the elongate element may be of plastic. The elongate element defines an axis which is substantially coincident with the axis of the gas flow duct. The axis of the element 20 is substantially coincident with the axis of the gas flow duct. The arrangement is such that when the gas generator 2 generates gas, the gas will be directed to flow generally along the passage defined within the helical turns of the element 20.

It is to be noted that in the presently described embodiment the turns of the element 20 are spaced further apart in regions where the gas flow duct 6 communicates with the cells 8, 9, 11, 12 than in the remaining regions of the gas flow duct 6.

As can be seen from FIG. 2 of the accompanying drawings, in the presently described embodiment of the invention the element 20 is a helical coil which is formed of a steel wire 21 of round cross-section. The turns in the portion of the element 20 illustrated are of a uniform diameter and are evenly spaced, but as mentioned above, where the gas flow duct communicates with the cells, a wider spacing may be appropriate. The element 20 serves to keep the gas flow duct 6 fully open, even though the inflatable element 3 is initially folded and in a very compact state.

As the gas from the gas generator passes through the adjacent turns of the element 20, a turbulent gas flow is created and gas thus diffuses through the many turns of the element 20. It has been found that by using an element with successive helical turns the gas passes through the adjacent turns in the regions where the gas supply duct and the cells communicate, and is delivered over a very large area within the inflatable element in a manner which is not excessively aggressive. Thus the fabric of the inflatable element is not damaged. The adjacent turns of the element therefore work as a filtering screen. This is in contrast with an arrangement where the gas flows through a gas duct which has relatively small apertures therein through which the gas flow into the inflatable element, since the gas flows through the apertures as a very fast flowing jet which can damage the fabric from which the inflatable element is made.

In the embodiment illustrated in FIGS. 1 and 2, the elongated element 20 extends over the entire length of the gas flow duct 6. It is to be appreciated, however, that in a modified embodiment the element 20 could extend over only part of the gas flow duct.

Because, in the preferred embodiment, the gas flow duct incorporates an elongate element formed of a plurality of successive tunis, the elongate element has a degree of flexibility. Thus the preferred inflatable element may easily be mounted in a motor vehicle without any problems of "tolerance" arising, as the inflatable element and elongate element may be readily bent or deformed to have the required shape. Indeed, a single model of inflatable element may be suitable for use in a number of different models of motor vehicle which are of generally similar design, at least as far as the roof line is concerned.

FIG. 3 illustrates a modified embodiment in which the element 20 comprises an elongate element formed from a wire of square cross-section. In other modified embodiments the element 20 may have turns of oval or rectangular section, for example so that the width of each turn, in the axial direction, is greater than the width of the gap between adjacent turns.

FIG. 4 illustrates an elongate element 20 forming an alternative embodiment of the invention. In this embodiment an elongate element is used in which the turns are initially very close together. The turns are turns of a uniform diameter, as shown.

When the gas generator of an inflatable element as illustrated in FIG. 4 is activated, gas will flow through the passage defined within the interior of adjacent turns of the elongate element with a very substantial axial speed component. The gas thus applies a force to the turns which tends to cause a lengthening of the elongate element 20. Thus the elongate element 20 gradually lengthens to have the condition illustrated in FIG. 5, thus creating apertures between adjacent turns through which the gas may flow from the gas flow passage into the cells that are to be inflated. It is to be understood that part of the initial energy of the gas flow is utilized in lengthening the elongate element 20, thus reducing the speed of flow of the gas and minimizing the risk that the gas will aggressively damage the fabric from which the air-bag is formed. The elongate element will initially extend over only part of the length of the gas flow duct. However, on inflation of the inflatable element, the length of the element 20 will increase so that the inflatable element extends over the whole of the full length of the gas supply duct.

FIG. 6 shows an elongate element 20, in which the terminal turns 23 are of a relatively small diameter and turns intermediate the ends of the element, turns 24, are of a larger diameter. The end of the element 20 adjacent the gas generator also has turns 25 of a diameter less than the diameter of turns 24. The element 20 initially has adjacent turns vely close together or touching. As gas flows through the passage defined by the adjacent turns, gas will impinge on the adjacent turns and the length of the element 20 will increase.

FIG. 7 shows a further elongate element 20 which initially has adjacent turns close together. One end of the elongate element, remote from the gas generator, is closed by a cap 26. Gas flowing through the passage defined by the adjacent turns of the element 20 will impinge on the cap and cause the element 20 to extend. Some of the turns 27 are made to be weaker than other turns 28. As the element extends the turns 27 become spaced apart further than the turns 28. Gas will flow out of the passage defined within the adjacent turns more readily where the turns are spaced further apart and these regions of the element are adapted to be aligned with the entrances to the cells that are to be inflated.

FIG. 8 shows a housing 30 which contains an inflatable element 31 which is similar to the inflatable element shown in FIG. 1. A region 32 of the inflatable element 31 which, when inflated, defines a plurality of cells is tightly folded in the lower part of the housing. A palt 33, which defines a gas supply duct is located in the upper part of the housing and contains an elongate element 34 which comprises a plurality of adjacent turns. The inflatable element 31 has a plurality of tabs 35 which project from the upper edge of the part 33 and extend out of the housing 30 to enable the inflatable element to be mounted in position. The inflatable element is connected, by a tube 36, to a gas generator 37.

Gas from the gas generator 36 may flow through the tube 35 into a flow passage defined within the adjacent turns of the elongate element 34. As this flow passage is open the gas may flow swiftly across the width of the inflatable element to initiate rapid inflation of the inflatable element.

An inflatable element as described may be transported relatively easily if the element 20 is initially in a compact state. It is envisaged that the elongate element 20 will not be damaged in an accident situation, as its design is such that it will resist compression transversely to its axis. It will be able to yield flexibly to evade damage.

What is claimed is:

1. A safety arrangement comprising an inflatable element adapted to be mounted in a motor vehicle, the inflatable element being associated with a gas generator adapted to generate gas in an accident situation, the inflatable element defining a gas flow duct leading from the gas generator to a region defining one or more cells adapted to be inflated by gas from the gas generator, the gas flow duct containing an elongate element having a plurality of adjacent substantially helical turns defining a longitudinal axis, the axis of the elongate element being substantially coincident with the axis of the gas flow duct, gas from the gas generator flowing through a flow passage defined within the turns of the said elongate element.

2. An arrangement according to claim 1 wherein the said region of the inflatable element defines a plurality of generally parallel cells.

3. An arrangement according to claim 1 wherein the gas flow duct extends adjacent a plurality of said cells to supply gas to the cells, the elongate element being positioned to extend through that part of the gas flow duct.

4. An arrangement according to claim 1 wherein the elongate element has a degree of flexibility.

5. An arrangement according to claim 1 wherein the elongate element is provided with a plurality of turns of constant diameter.

6. An arrangement according to claim 1 wherein the elongate element is provided with a plurality of turns of successively reducing diameter, the turns of least diameter being spaced furthest from the gas generator.

7. An arrangement according to claim 1 wherein the end of the elongate element remote from the gas generator has an end cap.

8. An arrangement according to claim 1 wherein the elongate element initially has adjacent turns very close to each other, the arrangement being such that the length of the elongate element increases in response to an axial flow of gas therethrough.

9. An arrangement according to claim 1 wherein the element is formed of a wire of circular cross-section.

10. An arrangement according to claim 1 wherein the element is formed of a wire of square cross-section.

11. An arrangement according to claims 1 wherein the elongate element initially extends over the whole length of the gas flow duct.

12. An arrangement according to claim 1 wherein the elongate element initially extends over only part of the length of the gas flow duct.

13. An arrangement according to claim 12 wherein, on inflation of the inflatable element, the elongate element extends over the full length of the gas flow duct.

14. An arrangement according to claim 1 wherein, when inflated, the turns of the elongate element adjacent the entrances to the cells are further apart than other turns of the elongate element.

15. An arrangement according to claim 1 wherein the upper edge of the inflatable element is non-linear, and is provided with means to connect the non-linear upper edge thereof to a non-linear part of a motor vehicle.

16. An arrangement according to claim 1 wherein the lower part of the inflatable region of the inflatable element is provided with at least one strap adapted to extend from the inflatable element to an anchoring point.

17. An arrangement according to claim 1 wherein the gas generator is connected to the inflatable element by a separate tube.

* * * * *